July 21, 1964
C. M. BERRY
3,141,374
AUDIO VIEWER EQUIPMENT
Filed Aug. 8, 1960
3 Sheets-Sheet 3
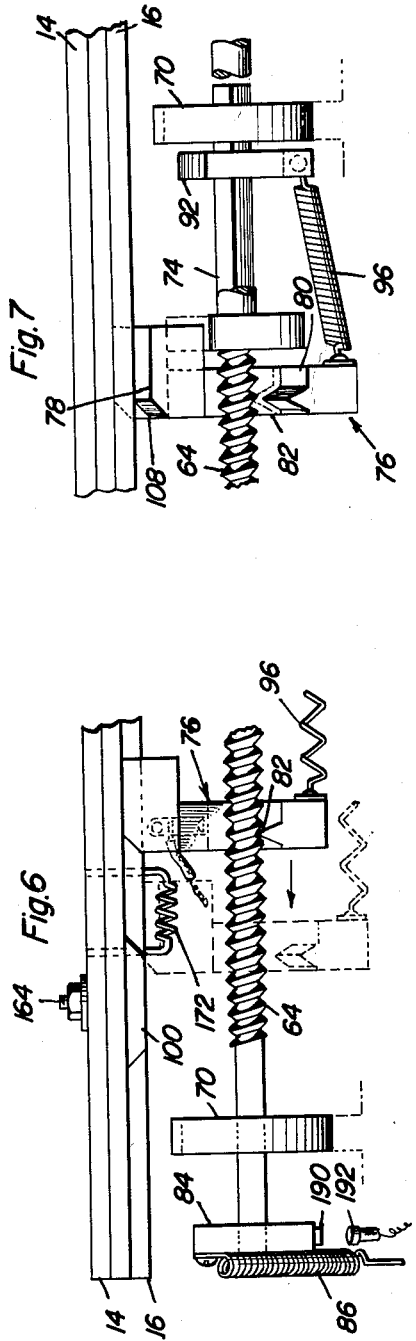
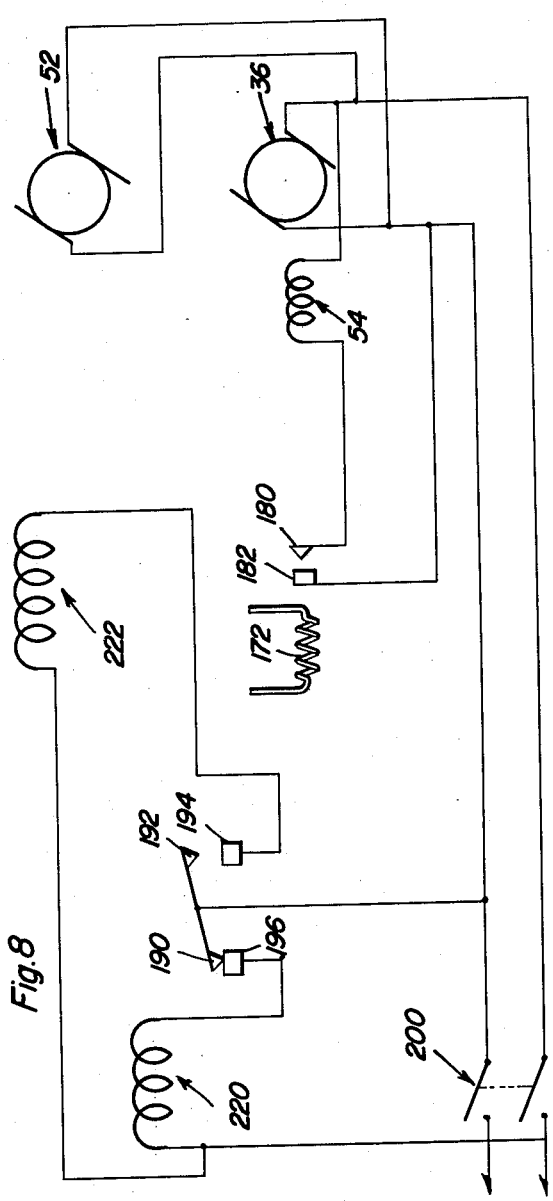
Catherine M. Berry
INVENTOR.
BY *Clarence A. O'Brien*
*and Harvey B. Jacobson*
Attorneys United States Patent Office 3,141,374
Patented July 21, 1964

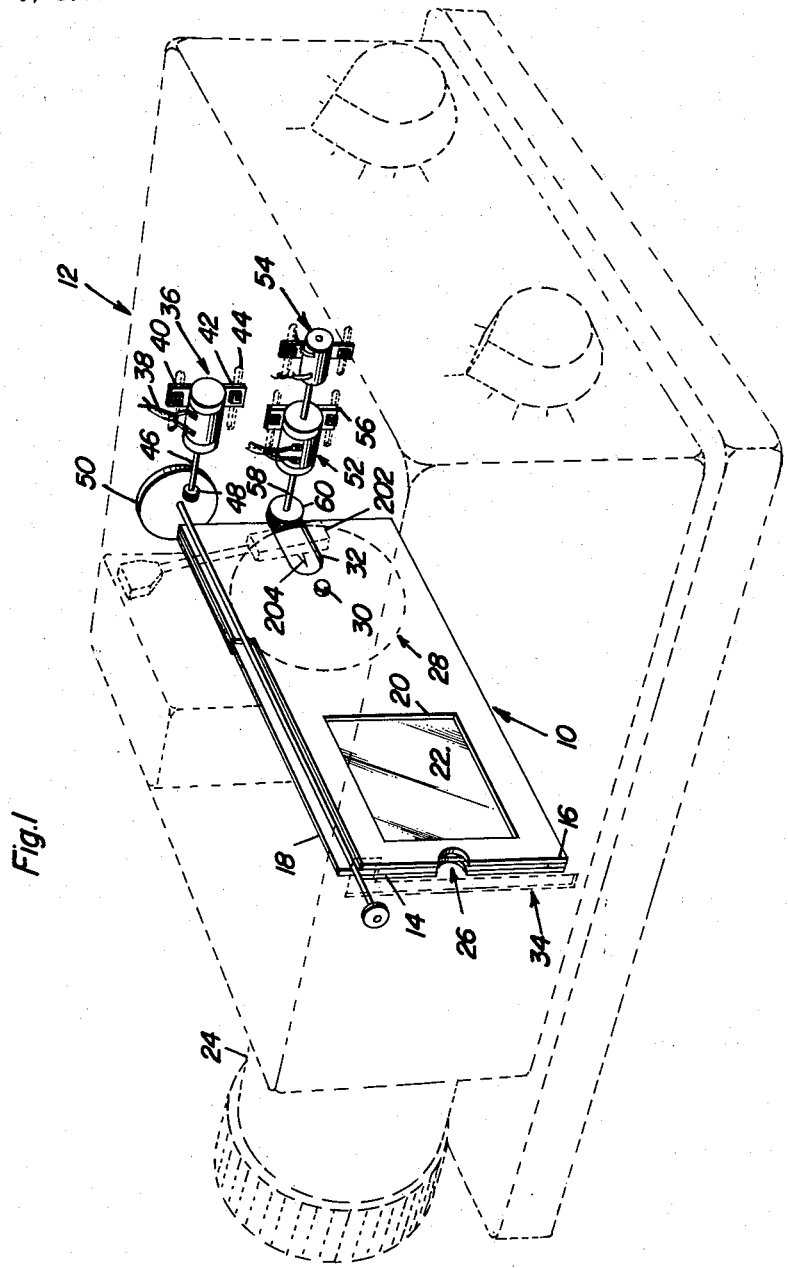

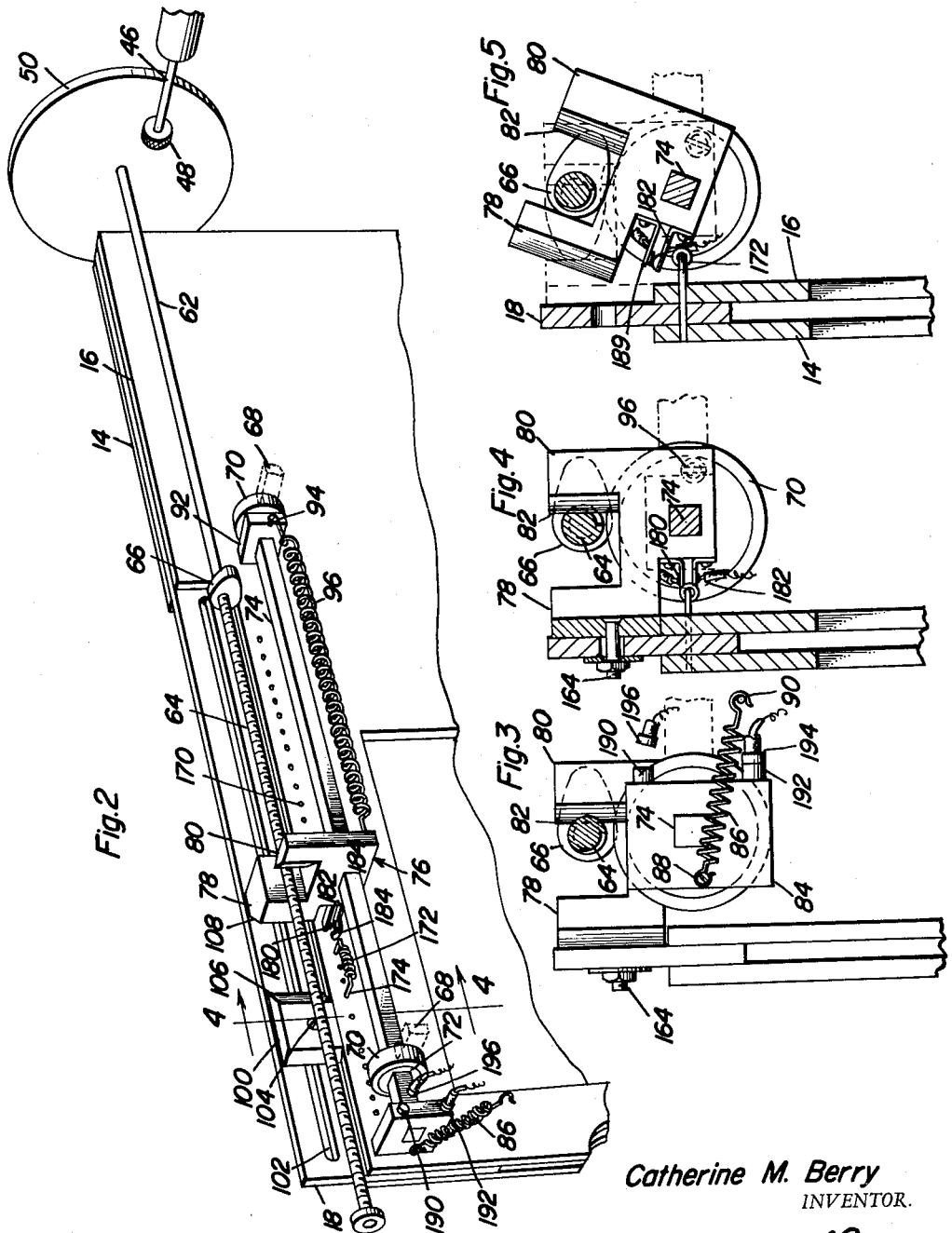

3,141,374
AUDIO VIEWER EQUIPMENT
Catherine M. Berry, 4900 Woodman Ave.,
Sherman Oaks, Calif.
Filed Aug. 8, 1960, Ser. No. 47,998
20 Claims. (Cl. 88—28)

This invention relates generally to audio viewer equipment and more particularly to a device in which an optical image record such as a photographic transparency or slide is associated with a recorded message by providing a holder or audio viewer card for the slide and recording disc.

The popularity of photographic transparencies or slides has increased considerably in recent years. Many vacationers and travellers often obtain several slides of the areas they have visited and employ them at later dates for pleasure, recollection, and educational purposes. Regardless of the use made of the transparencies, it is often necessary that a narration be provided to supplement the illustration on the transparency. It is proposed that the foregoing objectives may be accomplished through a recording disc to be associated with a photographic transparency by simultaneous projection of the transparency and play back of the disc under control of appropriate equipment. It is accordingly the principal object of this invention to provide audio viewer equipment including an audio viewer card carrying both a photographic transparency and a recording disc along with apparatus for projecting the transparency and playing back the disc.

It is a more particular object of this invention to provide audio viewer equipment including means which permits simultaneous projection and sound reproduction with greater flexibility than heretofore possible. More particularly, means are provided for positioning a slide or transparency and a sound recording in a fixed relationship with each other while at the same time permitting the rapid removal and replacement of either the slide or recording.

It is a still more particular object of this invention to provide audio viewer equipment including means for controlling the viewing time of each slide which is independent of, and not controlled by, the associated recording. For this purpose, a unique and easily adjustable means for controlling the viewing time is employed.

It is a still more particular object of this invention to provide audio viewer equipment which enables a series of independent talking still pictures to be shown which may be combined into a program of variable length and variable sequence.

It is a still more particular object of this invention to provide audio viewer equipment which is relatively simple in design and accordingly inexpensive to produce and maintain.

It is a still more particular object of this invention to provide audio viewer equipment which lends itself to use with automatic timing and handling mechanisms. The equipment herein permits the projection viewing time for each slide to be predetermined while at the same time allowing for a single system adjustment which permits the viewing time for each and every slide to be changed by a uniform factor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the invention showing an audio viewer card received in the apparatus for permitting time display of the transparency therein and timed actuation of the play back apparatus;

FIGURE 2 is an enlarged fragmentary perspective view of the audio viewer card and associated apparatus for effecting the timed operations thereon;

FIGURE 3 is an end elevational view of the card and associated apparatus;

FIGURE 4 is a vertical sectional view taken substantially along the plane 4—4 of FIGURE 2;

FIGURE 5 is a sectional view similar to FIGURE 4 illustrating however the square shaft in a second extreme pivoted position;

FIGURE 6 is a fragmentary top plan view showing the audio view card and particularly illustrating the relationship between the card, follower, and threaded shaft;

FIGURE 7 is a fragmentary top plan view of the card, follower, threaded shaft, and square shaft; and FIGURE 8 is a schematic wiring diagram illustrating the electrical connections employed in the equipment.

With continuing reference to the drawings, initial attention is called to FIGURE 1 wherein the audio viewer card 10 is illustrated as received within the apparatus 12. The audio viewer card 10 includes spaced first and second flat members 14 and 16 respectively. The members 14 and 16 are spaced from each other by an interconnecting spacer 18 which projects beyond the members 14 and 16 at the top edge thereof. A first photographic transparency pocket is defined between the spaced members 14 and 16 with aligned viewing apertures 20 being defined in each of the members for permitting light transmission therethrough enabling the projection of the information on an optical record or image source in the form of transparency 22 within the pocket to be cast through a lens carried by a focusing barrel 24. In order to permit easy insertion and removal of the transparency 22 into the pocket defined between the members 14 and 16, finger indentations 26 are provided. A second pocket is formed by the card 10 for receiving a message or sound signal source in the form of recording disc 28. The disc 28 is provided with a central axle 30 which extends through aligned axle openings in the first and second members 14 and 16 with the axle 30 being rotatably journaled in the openings. A tone arm axle slot 32 is defined by the member 16 and extends radially with respect to the disc 28.

The card 10 may be received in the apparatus 12 through a slot 34. Mounted on a wall of the apparatus housing is timing means including a timing motor 36 actuatable through conductors 38 and movable along the wall by bolts 40 received in nuts 42 which extend through parallel grooves 44 formed in the wall. The timing motor 36 is provided with an output shaft 46 terminally carrying a friction drive wheel 48 engaged with a drive disc 50.

A second disc drive motor 52 as part of the sound reproducing means is also mounted on the wall below the motor 36. The motor 52 is mounted in the same manner as the motor 36 and accordingly may also be moved inwardly and outwardly along the wall. A solenoid 54 is aligned with the motor 52 and is also mounted for movement along the wall of the apparatus housing. The solenoid 54 is provided with an armature 56 which is coupled to the output shaft 58 of the motor 52 for enabling forward and rearward movement of the friction drive wheel 60 carried by the shaft 58. With the card 10 received in the slot 34 of the apparatus 12, energization of the solenoid 54 will project the shaft 58 and drive wheel 60 forwardly with the rim of the drive wheel 60 engaged with the rim of the recording disc 28 enabling rotation of the disc 28 as the axle 30 rotates in the axle openings provided in the members 14 and 16.

Attention is now drawn to FIGURE 2 wherein the drive wheel 48 and disc 50 for a constant timing mechanism are illustrated. It will be appreciated that inasmuch as the motor 36 driving the shaft 46 which in turn drives the wheel 48 is movable along the apparatus housing wall, the speed at which the disc 50 rotates may be regulated. That is, depending on the point of engagement between the wheel 48 and disc 50, the effective drive ratio therebetween may be varied.

A shaft 62 is secured to the disc 50 and is rotatable therewith. The shaft 62 is threaded along a portion 64 thereof. A cam 66 is secured to the shaft 62 at one end of the threaded portion.

A pair of supports 68 are fixed in the housing and carry bearings 70 in which flanges 72 are rotatable. The flanges 72 are fixed on a square shaft 74. Mounted for slidable program movement along the square shaft 74 is a drive-energizing switch follower 76 which is U-shaped and includes a pair of upwardly projecting legs 78 and 80. The leg 80 is provided with a forwardly projecting thread engaging edge 82 engageable with the threaded portion 64 of the shaft 62. The edge 82 threadedly engages the threaded portion 64 of the shaft 62 in a first pivoted position of the square shaft 74 as illustrated in FIGURES 3 and 4. Terminally carried by the square shaft 74 is a contact block 84 which has a spring 86 terminally secured thereto at 88. The second end of the spring 86 is fixed at 90 within the apparatus housing. Inasmuch as the spring 86 is mounted off center with respect to the square shaft 74, it will be appreciated that the spring 86 tends to pivot the square shaft 74 counterclockwise in FIGURES 3 and 4 so as to urge the edge 82 of the leg 80 into continually threaded engagement with the threaded portion 64 of the shaft 62. In this position, the leg 78 is spaced from the threaded shaft 64.

A block 92 is fixed by a setscrew 94 to the square shaft 74. A spring 96 constituting part of a reset mechanism is secured between the block 92 and the follower 76 for normally retaining the follower 76 proximate to the block 92 as shown in FIGURE 7. Although the spring 96 tends to retain the follower 76 proximate to the block 92, rotation of the shaft 62 by the disc 50 will cause the follower 76 to move along the square shaft 74 to the left as illustrated in FIGURE 2 as the edge 82 engages the threaded portion 64 of the shaft 62.

The card 10 is also provided with programming facilities which include an adjustable timing stop 100. The timing or limit stop 100 is adjustably mounted on a slot 102 formed in the spacer member 18 in the portion projecting beyond the members 14 and 16. A setscrew 104 may be employed to position the stop 100 as desired. Both the stop 100 and leg 78 of the follower 76 are provided with cammed engaging surfaces 106 and 108 respectively. As the shaft 62 rotates, the follower 76 is moved toward the left in FIGURE 2 against the spring tension of spring 96. When the surface 108 of the follower 76 engages the surfaces 106 of the stop 100, the follower 76 is forced away from the spacer 18 and the shaft 74 is pivoted into a second position as the flanges 72 rotate in the bearings 74. The spring 86 moves off center over the square shaft 74 to then retain the square shaft in the second pivoted position as shown in FIGURE 5. Pivotal movement of the square shaft 74 to the position shown in FIGURE 5 disengages the edge 82 of leg 80 of the follower 76 with the threaded portion 64 of the shaft 62 permitting the spring 96 to draw the follower 76 back to the position shown in FIGURE 7 proximate the block 92.

The programming facilities on the card 10 also includes a series of small spaced aligned apertures 170 and extensible actuators 172 in the form of springs are provided with the ends 174 of the springs 172 receivable in the apertures 170. Normally open or spaced leaf contacts 180 and 182 are carried by the follower 76 with the lower contact 182 being provided with an upturned forward edge 184. When the follower 76 moves toward the left as shown in FIGURE 2, engagement of the spring 172 with the upturned forward edge 184 of the lower contact 182 causes the contacts 180 and 182 to close. As will be appreciated later, when the contacts 180 and 182 are closed, the recorded message on the disc 28 is played back. The contact block carries a pair of reset control contacts 190 and 192. When the square shaft 174 is in the first pivoted position as shown in FIGURES 3 and 4, the contact 192 engages fixed contact 194 to complete a first circuit while when the square shaft 74 moves into the position shown in FIGURE 5, the contacts 192 and 194 open while contact 190 moves into engagement with fixed contact 196.

With continuing reference to FIGURE 8, the operating sequence of the equipment will now be explained. Initially, a film transparency 22 and recording disc 28 are inserted in the card 10. The viewing time stop 100 is positioned to the desired slide viewing interval as indicated by markings or graduations on the spacer 18. The extensible actuators 172 controlling the phonograph drive are inserted into the card using the time markings on the card as a guide. This completes the preparation of the card. A group of these cards 10 will constitute a program series or file.

In order to initiate operation of the apparatus, a master switch 200 is closed thereby energizing both timer drive motor 36 and disc drive motor 52. When the motor 36 is energized, the threaded shaft 62 begins to rotate. With the edge 82 of the follower 76 engaged with the threaded portion 64 of the shaft 62, the follower will be moved to the left as shown in FIGURE 2 along the square shaft. As the upturned portion 184 of the lower contact 182 of the spaced contacts 180 and 182 carried by the follower 76 moves into engagement with the spring 172, the solenoid 54 becomes energized to move the wheel 60 into driving engagement with the edge of the disc 28. A tone arm 202 carrying a stylus 204 rests on the disc 28 and rotation of the disc 28 by the wheel 60 will cause the cartridge tone arm to take information off the disc 28 which may be sent through appropriate audio amplifier equipment. The disc 28 will continue to rotate as long as the circuit is completed between the contacts 180 and 182 and this of course is determined by the positioning of the spring 172. This circuit will be broken when the contacts 180 and 182 move past the particular spring 172 during the course of traversing the threaded shaft 62. When the contacts 180 and 182 are no longer closed, the solenoid 54 will become deenergized causing the friction drive wheel 60 to disengage from the rim of the disc 28. As the follower 76 continues to traverse the shaft 62 to the left as shown in FIGURE 2, the contacts 180 and 182 will reach the next spring, and as explained previously, the disc 28 will begin to rotate. A number of such intermediate starts and stops in the sound play back system will therefore be possible. As the follower 76 continues to move to the left, it will reach a position whereby it mechanically contacts the stop 100 with the cam surfaces 106 and 108 engaging. As the follower 76 is forced away from the shaft 62, the square shaft will be caused to rotate to the second pivoted position shown in FIGURE 5 with the off center spring 86 on the contact block 84 retaining the square shaft in the second pivoted position. The pivoting of the square shaft 74 causes the closure of contacts 190 and 196 and actuation of a card-positioning solenoid 220 employed in a card changer mechanism for replacing the particular card 10 in the operative position within the apparatus 12. At the same time, the follower 76, now disengaged with the threaded portion 64 of the shaft 62, will be returned to its starting position on the square shaft 74 by the spring 96. The block 92 on the shaft 74 of course governs the return distance of the follower 76. The cam 66 fixed to the shaft 62 rotates against the leg 78 of the follower 76 forcing the square shaft into the first pivoted position with the edge 82 of the follower into threaded engagement with the threaded portion 64 of the shaft 62. The off center spring 86 snaps the square shaft 74 into the first pivoted position assuring positive engagement of the thread engaging edge 82 of the follower 76 with the threaded portion 64 of the shaft 62. This action also of course causes the closure of the contacts 192 and 194 which in turn actuate a reset solenoid 222 causing the tone arm to move into starting position with respect to the disc 28. By this time, the changing mechanism has completed its cycle and a new card is in operative position ready for use.

From the foregoing, the novel construction and operation of the device should be well understood. It is further to be pointed out that the particularly important feature incorporated in the design is the movement of the motor 36 which permits an adjustment of the rate at which the follower 76 moves along the threaded portion 64 of the shaft 62. By adjusting the position of the motor 36, the follower can be speeded up or slowed down, depending on the position of the wheel 48 on the disc 50. Since the follower 76 controls both the starting and stopping of the disc 28 and the changer activation mechanism, altering the speed of the follower 76 along its shaft can modify the pause time of the sound portion of the system and the total time in which the card is being viewed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An audio viewer card comprising a pair of flat members, means interconnecting said members in spaced relation to define therebetween a first transparency pocket and a second audio disc pocket, said members being provided with viewing apertures aligned with said first pocket to expose a transparency received in said first pocket, and axle openings aligned with said second pocket, an audio disc including a central axle received in said second pocket with said axle extending through and rotatably journaled in said openings and selectively variable program control means mounted on said interconnecting means and one of said members.

2. The combination of claim 1 including a zone arm access slot defined in one of said members adjacent said second pocket.

3. The combination of claim 1 wherein said interconnecting means includes a flat spacer received between said members, said spaced projecting beyond said members, and said program control means including a viewing time stop adjustably carried by said spacer.

4. The combination of claim 1 wherein said program control means further includes a series of aligned holes in one of said members.

5. Audio viewer equipment in combination with an audio viewer card carrying a transparency and an audio disc, including apparatus receiving said card in operative position permitting timed display of the transparency and playback of the audio disc comprising, a timing motor, a threaded shaft, adjustable means drivingly coupling said timing motor to said threaded shaft, a threaded follower engaged with said threaded shaft slidably mounted on a square shaft extending parallel to said threaded shaft for movement therealong, positioning means for holding and displacing said card from said operative position relative to said threaded shaft and follower, a viewing time stop adjustably carried by said card in said operative position to engage with said follower for disengagement thereof from the threaded shaft.

6. The combination of claim 5 wherein said square shaft is mounted for movement between a first extreme pivoted position wherein said follower is engaged with said threaded shaft and a second extreme pivoted position wherein said follower is not engaged with said threaded shaft, and an off center spring retaining said square shaft in one of said extreme positions.

7. The combination of claim 6 wherein each of said follower and said viewing time stop includes a cammed engaging surface whereby upon engagement said square shaft is pivoted from said first to said second pivoted position causing the resultant disengagement of said follower and threaded shaft.

8. The combination of claim 7 including spring means opposing said movement of said follower along said square shaft urging said follower into starting position on said square shaft wherein said follower is disengaged from said threaded shaft.

9. The combination of claim 8 including a cam secured to said threaded shaft engageable with said follower in said starting position for pivoting said square shaft from said second to said first position.

10. The combination of claim 9 including a first switch operable when said square shaft pivots from said second to said first position for engaging a tone arm with said disc and a second switch operable when said square shaft pivots from said first to said second position for changing cards in said operative position.

11. The combination of claim 5 including extensible actuators carried by said card, a pair of normally open contacts carried by said follower engageable with said actuators for closing said contacts, and means operatively connected to said contacts for rotating said disc.

12. For use with apparatus having image projecting means and sound producing means, a holder including, record receiving means adapted to expose an optical recorded image member to the projecting means and movably mount a sound recording member, and selectively adjustable program control means disposed in spaced relation to the record receiving means for presenting timing information corresponding to the viewing interval of the image exposed to the projecting means and movement of the sound recording member during said viewing interval.

13. In combination with the holder defined in claim 12, apparatus for operatively receiving said holder, comprising, holder positioning means operatively positioning the holder for projection of the recorded image member by the image projecting means, said sound producing means including playback means operatively aligned with the record receiving means for pickup engagement with the sound recording member, displaceable drive means engageable with the sound recording member for playback operation thereof, and control means operatively connected to the positioning means and drive means and engageable by the adjustable programming program control means for programmed energization and deenergization of the drive means and to render the positioning means operative to control the viewing interval.

14. The combination of claim 12 wherein said program control means comprises, adjustably positioned limit means on the holder for controlling the viewing interval and spaced contact means carried by the holder for time-controlled movement of the sound recording member.

15. In combination with the holder defined in claim 14, apparatus for operatively receiving said holder, comprising, positioning means operatively positioning the holder for projection of the recorded image member, playback means operatively aligned with the record receiving means for pickup engagement with the sound recording member, displaceable drive means engageable with the sound recording member for playback operation thereof, and control means operatively connected to the positioning means and drive means and engageable by the adjustable program control means for programmed energization and deenergization of the drive means and to render the positioning means operative to control the viewing interval.

16. The combination of claim 15 wherein said control means comprises, constant speed timing means, drive energizing switch means mounted for program movement in response to engagement with the timing means for programmed contact with said spaced contact means, and reset means responsive to engagement of the drive energizing switch means with said limit means to impart return movement to the drive energizing switch means and render the positioning means operative.

17. Audio viewer equipment in combination with an audio viewer card carrying a transparency and an audio disc, including apparatus receiving said card in operative position permitting timed display of the transparency and playback of the audio disc comprising; adjustable timing means, movable means having a driving connection to said timing means for movement thereby, positioning means for holding and displacing said card from said operative position relative to the movable means, interval control means carried by said card in said operative position to operatively engage the movable means for disabling said driving connection to the timing means to determine a viewing interval, drive means rendered operative simultaneously with said timing means to rotate said audio disc for reproducing a message recorded thereon, and spacing control means selectively mounted on the card and operatively engageable with said timing means to render the drive means operative for programmed reproduction of the message during said viewing interval.

18. The combination of claim 17 wherein said spacing control means comprises a plurality of extensible contact elements insertable within selected apertures of a plurality of spaced time-indicating apertures formed on said card for carrying the spacing control means.

19. In combination with apparatus having image projection means and sound producing means, record holding means for carrying separate replaceable optical and sound signal sources in operative relationship to the projection means and the sound producing means respectively, means for displacing said record holding means from said operative relationship to terminate an image viewing interval, adjustable limit means mounted in the record holding means, timing means operatively connected to said sound producing means and said displacing means and engageable by said limit means for determining said viewing interval, and spacing control means selectively mounted on said record holding means for operative engagement with said timing means during said viewing interval to program the reproduction of the sound signal source by the sound producing means.

20. In combination with apparatus having an image projection device and an audio signal pick-up device, record holding means for carrying optical image and audio signal sources in operative relationship to the projection device and the pick-up device respectively, drive means engageable with said audio signal source for imparting movement thereto, displaceable means engageable with the record holding means for displacement thereof from said operative relationship to simultaneously terminate an image viewing interval of the projection device and movement of the audio signal source by the drive means, program control means carried by the record holding means for selectively presenting timing information corresponding to said viewing interval and spaced interruptions of the movement imparted to the audio signal source during said viewing interval, and timing control means operatively connected to the drive means and the displaceable means for engagement with the program control means to space said interruptions within the viewing interval in accordance with the timing information presented by the program control means.

References Cited in the file of this patent

UNITED STATES PATENTS

| | | |
|---|---|---|
| 2,704,008 | Owens | Mar. 15, 1955 |
| 2,823,472 | Waller | Feb. 18, 1958 |
| 2,847,905 | Novak | Aug. 19, 1958 |
| 2,885,208 | Panter | May 5, 1959 |
| 2,907,128 | Norton | Oct. 6, 1959 |
| 2,915,840 | Wiklund | Dec. 8, 1959 |
| 2,961,922 | Schwartz et al. | Nov. 29, 1960 |
| 3,057,255 | Bregman | Oct. 9, 1962 |

FOREIGN PATENTS

| | | |
|---|---|---|
| 899,429 | Germany | Dec. 10, 1953 |